US010956313B2

(12) United States Patent
Hay et al.

(10) Patent No.: US 10,956,313 B2
(45) Date of Patent: *Mar. 23, 2021

(54) APPLICATION TESTING FOR SECURITY VULNERABILITIES

(71) Applicant: International Business Machines Corporation, Armonk, NY (US)

(72) Inventors: Roee Hay, Haifa (IL); Omer Tripp, Bronx, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/452,583

(22) Filed: Jun. 26, 2019

(65) Prior Publication Data
US 2019/0317888 A1 Oct. 17, 2019

Related U.S. Application Data

(63) Continuation of application No. 14/731,473, filed on Jun. 5, 2015, now Pat. No. 10,380,006.

(51) Int. Cl.
*G06F 11/36* (2006.01)
*G06F 21/54* (2013.01)
(Continued)

(52) U.S. Cl.
CPC ...... *G06F 11/3688* (2013.01); *G06F 11/3672* (2013.01); *G06F 21/54* (2013.01);
(Continued)

(58) Field of Classification Search
CPC .............. G06F 11/3688; G06F 21/577; G06F 2221/033; H04L 63/1433; H04L 63/1425
See application file for complete search history.

(56) References Cited

U.S. PATENT DOCUMENTS

| 7,603,715 B2 | 10/2009 | Costa |
| 8,387,017 B2 | 2/2013 | Calendino |

(Continued)

FOREIGN PATENT DOCUMENTS

| WO | 2014133528 A1 | 9/2014 |
| WO | 2014145604 A1 | 9/2014 |

OTHER PUBLICATIONS

Almorsy et al., "Supporting automated vulnerability analysis using formalized vulnerability signatures", 2012 Proceedings of the 27th IEEE/ACM International Conference on Automated Software Engineering, Essen, 2012, pp. 100-109.

(Continued)

*Primary Examiner* — Saleh Najjar
*Assistant Examiner* — Feliciano S Mejia
(74) *Attorney, Agent, or Firm* — Edward J. Wixted, III (57) ABSTRACT

In an approach for testing an application for a security vulnerability, a processor inserts an instrumentation hook in the application to be tested, wherein the instrumentation hook is executed prior to a sink operation. A processor transmits a probe input value to the application to be tested. A processor detects a modification to the probe input value at the instrumentation hook by comparing the probe input value at the instrumentation hook to a signature value and detecting that the probe input value matches the signature value. A processor removes the sink operation from testing for the security vulnerability.

20 Claims, 5 Drawing Sheets

(51) Int. Cl.
  *H04L 29/06*   (2006.01)
  *G06F 21/57*   (2013.01)
(52) U.S. Cl.
  CPC ........ *G06F 21/577* (2013.01); *H04L 63/1425* (2013.01); *H04L 63/1433* (2013.01); *G06F 2221/033* (2013.01)

(56) References Cited

U.S. PATENT DOCUMENTS

| | | | |
|---|---|---|---|
| 8,578,487 | B2 | 11/2013 | Soeder |
| 8,601,586 | B1 | 12/2013 | Boutros |
| 8,656,497 | B2 | 2/2014 | Amarasinghe et al. |
| 8,726,394 | B2* | 5/2014 | Maor ................ G06F 11/3688 726/25 |
| 8,756,698 | B2* | 6/2014 | Sidagni ................ G06F 21/577 709/200 |
| 8,850,396 | B2 | 9/2014 | Pasternak |
| 8,990,392 | B1* | 3/2015 | Stamos ................ H04L 43/08 709/224 |
| 9,118,713 | B2 | 8/2015 | Bisht |
| 9,237,164 | B2* | 1/2016 | Harlacher ........... H04L 63/1425 |
| 9,246,932 | B2* | 1/2016 | Gorny ................. H04L 63/145 |
| 9,305,168 | B2 | 4/2016 | Brucker et al. |
| 9,329,974 | B2 | 5/2016 | Levit-Gurevich |
| 9,390,269 | B2 | 7/2016 | Beskrovny |
| 10,104,081 | B2* | 10/2018 | Kay ..................... H04W 12/08 |
| 2003/0192027 | A1* | 10/2003 | Porter ..................... G06F 8/34 717/100 |
| 2006/0282897 | A1 | 12/2006 | Sima |
| 2012/0179935 | A1 | 7/2012 | Wang |
| 2012/0255023 | A1 | 10/2012 | Maor |
| 2014/0109227 | A1 | 4/2014 | Kalman |
| 2014/0304688 | A1 | 10/2014 | Bhat |
| 2016/0359896 | A1 | 12/2016 | Hay |
| 2017/0142138 | A1 | 5/2017 | Williams |
| 2019/0325145 | A1 | 10/2019 | Siman et al. |

OTHER PUBLICATIONS

Avramescu et al., "Guidelines for Discovering and Improving Application Security", 2013 19th International Conference on Control Systems and Computer Science, Bucharest, 2013, pp. 560-565, <http://ieeexplore.ieee.org/stamp/stamp.jsp?tp=&number=659320&isnumber=6569227>.

Grace Period Disclosure: "IBM Bluemix General Availability!", Printed May 1, 2015, pp. 1-9, <http://ibm.com/bluemix/2014/06/30/general-availability>.

Kim et al., "SPLat: Lightweight Dynamic Analysis for Reducing Combinatorics in Testing Configurable Systems", ESEC/FSE '13, Aug. 18-26, 2013, Saint Petersburg, Russia ©2013 ACM 978-1-4503-2237—Sep. 13, 2008; pp. 1-11.

Tripp et al., "Finding your way in the testing jungle: a learning approach to web security testing", ISSTA 2013 Proceedings of the 2013 International Symposium on Software Testing and Analysis, Jul. 15-20, 2013, ISBN: 978-1-4503-2159-4, pp. 347-357.

IBM, "List of Patent Applications Treated As Related", Appendix P, Dated Jun. 25, 2019, 2 pages.

* cited by examiner

APPLICATION TESTING FOR SECURITY VULNERABILITIES

STATEMENT REGARDING PRIOR DISCLOSURES BY THE INVENTOR OR A JOINT INVENTOR

The following disclosure(s) are submitted under 35 U.S.C. 102(b)(1)(A):
(i) IBM Bluemix General Availability!, Erwin, Tony, Jun. 30, 2014.

BACKGROUND

The present invention relates to testing, and more specifically, but not exclusively, to application testing for security vulnerabilities.

Software testing is an investigation conducted to provide stakeholders with information about the quality of the product or service under test. Software testing can also provide an objective, independent view of the software to allow the business to appreciate and understand the risks of software implementation. Test techniques include, but are not limited to, the process of executing a program or application with the intent of finding software bugs (errors or other defects).

Mobile application testing is a process by which application software developed for hand held mobile devices is tested for its functionality, usability, and consistency. Mobile application testing can be an automated or a manual type of testing.

In computer security, a vulnerability is a weakness that allows an attacker to reduce a system's information assurance. Vulnerability is the intersection of three elements: a system susceptibility or flaw, attacker access to the flaw, and attacker capability to exploit the flaw. To exploit a vulnerability, an attacker must have at least one applicable tool or technique that can connect to a system's weakness.

SUMMARY

Aspects of an embodiment of the present invention disclose a computing system, a method, and a computer program product for testing an application for a security vulnerability. A processor inserts an instrumentation hook in the application to be tested, wherein the instrumentation hook is executed prior to a sink operation. A processor transmits a probe input value to the application to be tested. A processor detects a modification to the probe input value at the instrumentation hook by comparing the probe input value at the instrumentation hook to a signature value and detecting that the probe input value matches the signature value. A processor removes the sink operation from testing for the security vulnerability.

DETAILED DESCRIPTION

Software applications are increasingly sharing data with a growing number of hardware components, additional applications, and external computing devices. For example, many mobile devices include software applications that frequently provide data to any number of external computing devices and server applications. In some examples, a software application can provide data that includes malicious content to an external source. For example, an application for a mobile device may provide data that includes malicious content to a database on a web server and the web server may transmit the malicious content to additional computing devices. In some instances, testing a software application for vulnerabilities based on whether the software application can share or spread malicious content can be challenging and time consuming.

According to embodiments of the present disclosure, a computing device can test an application for a security vulnerability. A security vulnerability, as referred to herein, can include any failure of an application to sanitize or validate received data. An application can sanitize received data by removing control characters or elements that result in the execution of scripts, functions, operations, and the like. In some examples, an application that does not sanitize received data may receive data that includes malicious content which changes the application's expected behavior. In some examples, the malicious content can include computer code from any suitable dynamic scripting language.

In some embodiments, the computing device may test any number of sink operations in an application to detect a security vulnerability. A sink operation, as referred to herein, includes any suitable sensitive security operation. For example, a sink operation can include an operation that transmits data to a database, or controls a browser's URL, among others. In some examples, the computing device tests each sink operation for multiple security vulnerabilities. Accordingly, the testing process can be time consuming and expensive. The embodiments described herein can indicate sink operations that do not need to be tested for some security vulnerabilities and remove test cases targeting the security vulnerabilities for some sink operations. Thus, the embodiments described herein can reduce the amount of time and the number of resources used to test an application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface, such as a web browser (e.g., web-based email). The consumer does not manage or control the underlying cloud infrastructure, including: network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including: networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (e.g., private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
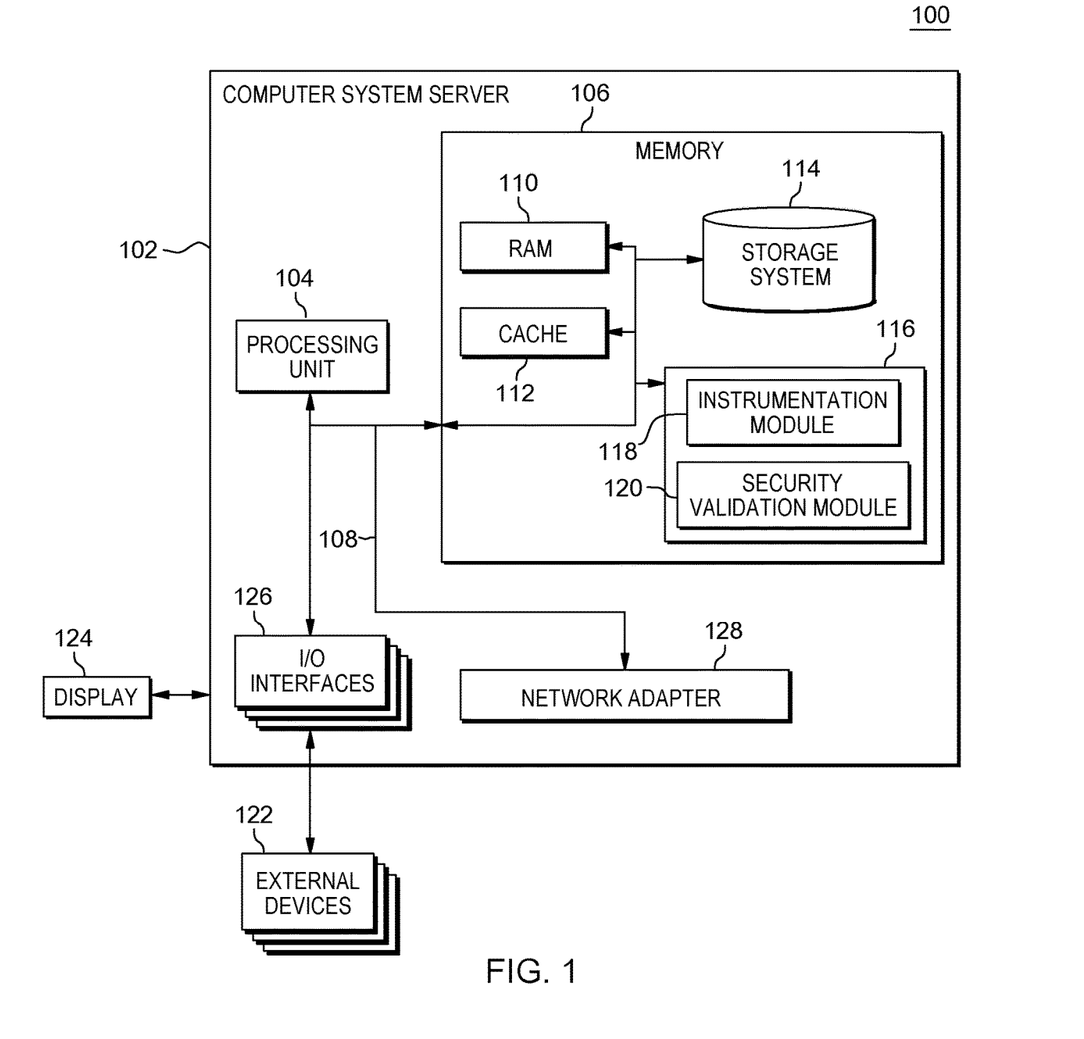
FIG. 1 depicts a block diagram of a cloud computing node that can test an application for a security vulnerability, according to an embodiment described herein.

Referring now to FIG. 1, a schematic of an example of a cloud computing node that can test an application for a security vulnerability is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100, there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system executable instructions, such as program modules being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 102 in cloud computing node 100 is shown in the form of a general purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116 having a set (at least one) of program modules, such as the instrumentation module 118 and security validation module 120, may be stored in memory 106 by way of example, and not limitation, as well as an operating system, one or more application programs, other program modules, and program data. Each of the operating systems, one or more application programs, other program modules, and program data, or some combination thereof, may include an implementation of a networking environment. The instrumentation module 118 and the security validation module 120 generally carry out the functions and/or methodologies of embodiments of the invention as described herein.

Computer system/server 102 may also communicate with one or more external devices 122, such as a keyboard, a pointing device, a display 124, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 126. Still yet, computer system/server 102 can communicate with one or more networks, such as a local area network (LAN), a general wide area network (WAN), and/or a public network (e.g., the Internet) via network adapter 128. As depicted, network adapter 128 communicates with the other components of computer system/server 102 via bus 108. It should be understood that although not shown, other hardware and/or software components could be used in conjunction with computer system/server 102. Examples include, but are not limited to, microcode, device drivers, redundant processing units, external disk drive arrays, RAID systems, tape drives, and data archival storage systems, etc.

In some embodiments, the instrumentation module 118 can insert an instrumentation hook in the application to be tested. An instrumentation hook, as referred to herein, can include an instruction or operation that indicates the values of any suitable number of variables or objects in the application being tested. For example, the instrumentation hook can indicate the value of a variable that stores received data. The instrumentation hook can be inserted so that the instrumentation hook is executed prior to a sink operation. In some embodiments, the instrumentation module 118 can also transmit a probe input value to the application to be tested. The probe input value can include any suitable element or component that is shared by security vulnerabilities. For example, the probe input value can include brackets associated with multiple scripting security vulnerabilities or elements from a structured query language (SQL) for database related security vulnerabilities, such as SQL injection, among others. The probe input value may not include a valid script or operation. Rather, the probe input value may include common characteristics of multiple security vulnerabilities. Moreover, the probe input can be benign, i.e. not associated with any security vulnerability. In some examples, the instrumentation module 118 can analyze the flow of data in an application to ensure that the probe input value flows to a sink operation and the instrumentation hook inserted prior to the sink operation.

In some embodiments, the security validation module 120 can detect a modification to the probe input value at the instrumentation hook. The modification can indicate that the application detected that received data included malicious content and sanitized the received data by removing control characters, and the like. The security validation module 120 can also detect if a sink operation was not executed or if a sink operation was executed without the probe input value. The security validation module 120 can also remove a sink operation from testing for a security vulnerability in response to detecting the modification to the probe input value, detecting that a sink operation was not executed, or detecting that a sink operation was executing without a probe input value. For example, the security validation module 120 can determine that a sink operation is not to be tested if the application sanitizes received data to prevent the transmission of a type of malicious content. Furthermore, a security vulnerability may not be tested if the sink operations in an application sanitize a probe input value, or are not executed with the probe input value.

It is to be understood that the block diagram of FIG. 1 is not intended to indicate that the computer system/server 102 is to include all of the components shown in FIG. 1. Rather, the computer system/server 102 can include fewer or additional components not illustrated in FIG. 1 (e.g., additional memory components, embedded controllers, additional modules, additional network interfaces, etc.). Furthermore, any of the functionalities of the instrumentation module 118, and the security validation module 120 may be partially, or entirely, implemented in hardware and/or in the processing unit (also referred to herein as processor) 104. For example, the functionality may be implemented with an application specific integrated circuit, or in logic implemented in the processor 104, among others.

Figure 2:
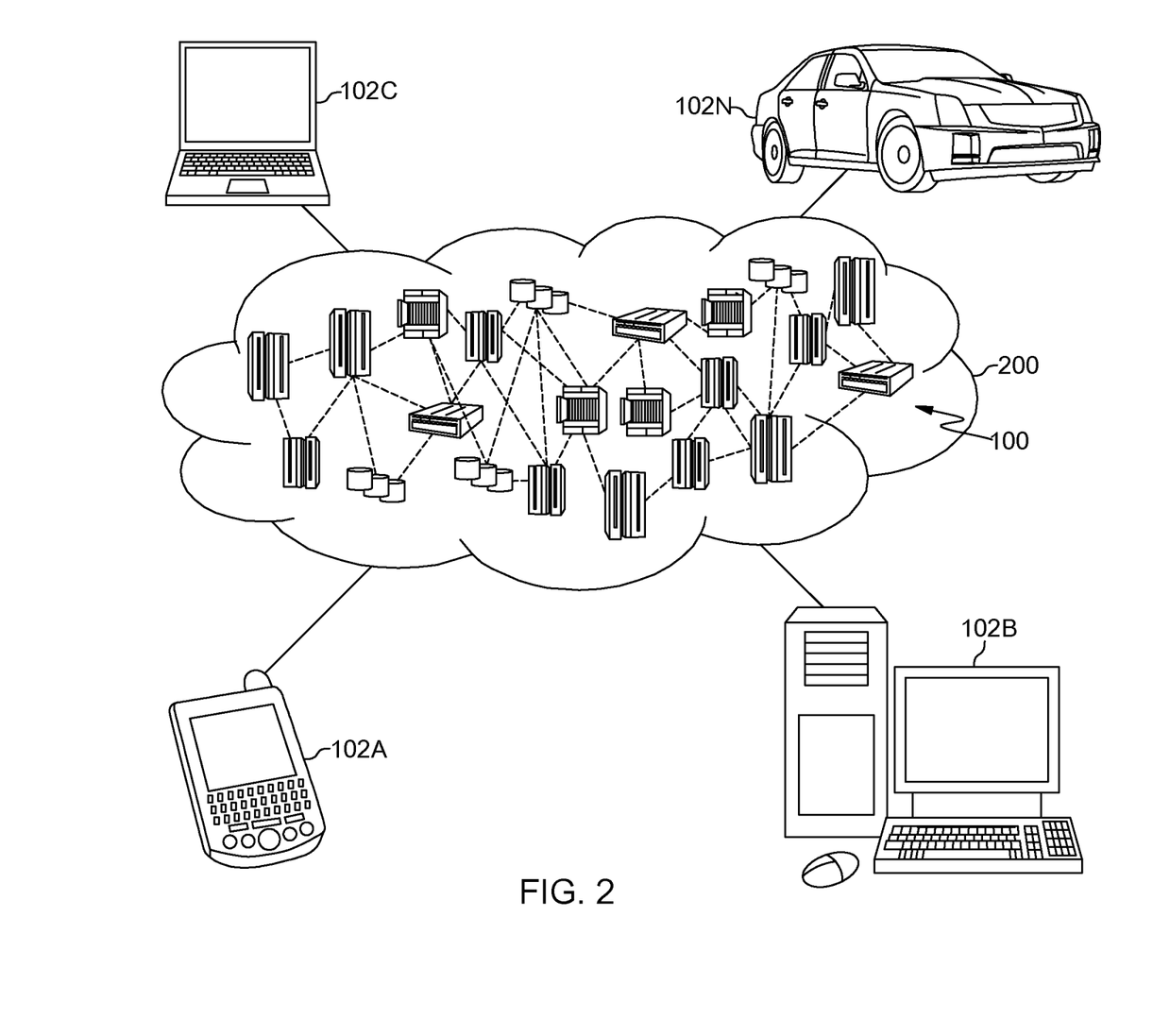
FIG. 2 depicts a cloud computing environment that can test an application for a security vulnerability, according to an embodiment described herein.

Referring now to FIG. 2, an illustrative cloud computing environment 200 that can test an application for a security vulnerability is depicted. As shown, cloud computing environment 200 comprises one or more cloud computing nodes 100 with which local computing devices used by cloud consumers may communicate, such as, for example, personal digital assistant (PDA) or cellular telephone 102A, desktop computer 102B, laptop computer 102C, and/or automobile computer system 102N. Nodes 100 may communicate with one another. They may be grouped (not shown) physically or virtually, in one or more networks, such as Private, Community, Public, and/or Hybrid clouds as described hereinabove, or a combination thereof. This allows cloud computing environment 200 to offer infrastructure, platforms, and/or software as services for which a cloud consumer does not need to maintain resources on a local computing device. It is understood that the types of computing devices 102A-N shown in FIG. 2 are intended to be illustrative only and that computing nodes 100 and cloud computing environment 200 can communicate with any type of computerized device over any type of network and/or network addressable connection (e.g., using a web browser, among others).

Figure 3:
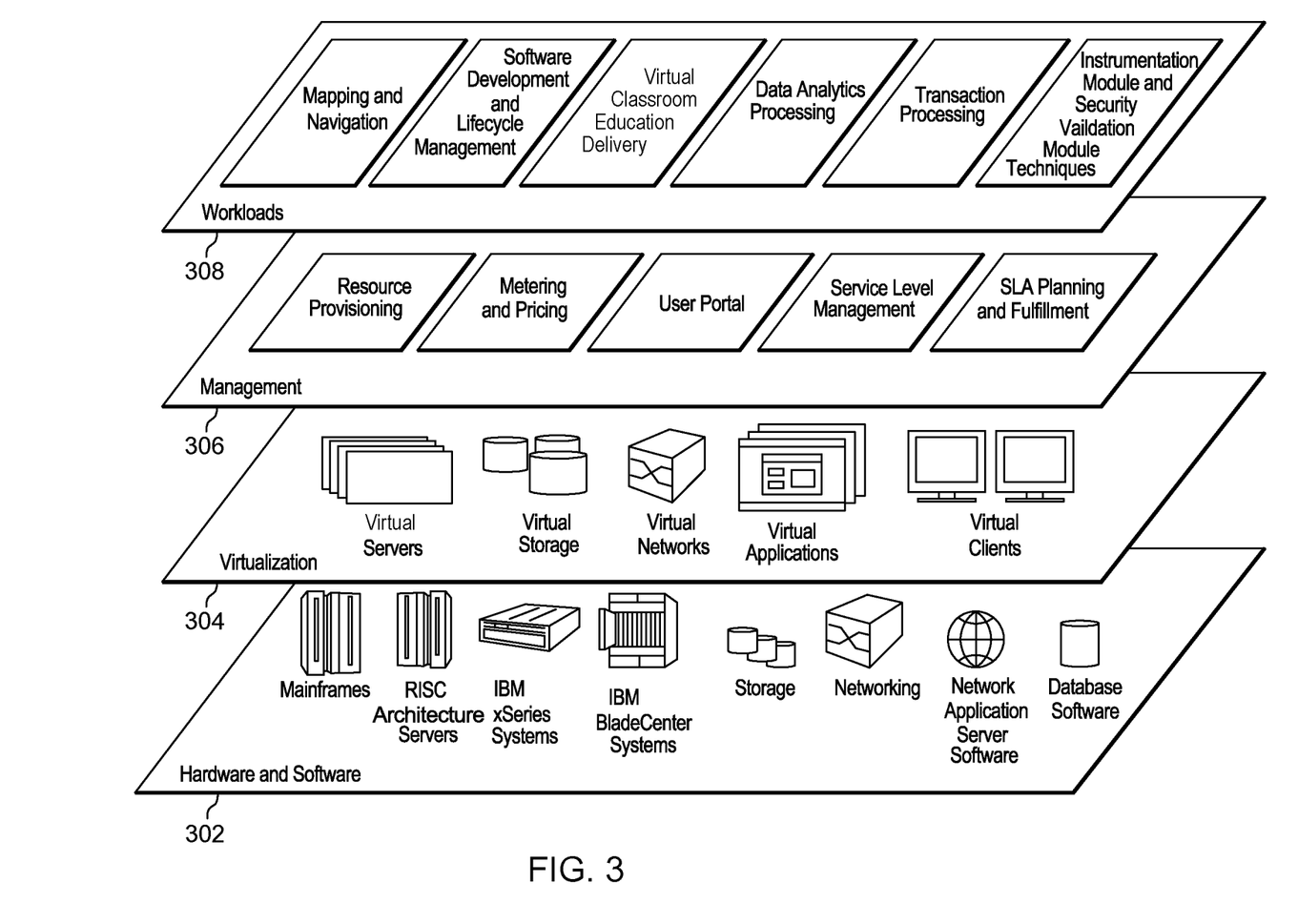
FIG. 3 depicts abstraction model layers used to implement techniques for testing an application for a security vulnerability, according to an embodiment described herein.

Referring now to FIG. 3, a set of functional abstraction layers used to implement techniques for testing an application for a security vulnerability provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes; RISC (Reduced Instruction Set Computer) architecture based servers; storage devices; networks and networking components. Examples of software components include network application server software and database software.

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management, such that required service levels are met. Service Level Agreement (SLA) planning and fulfillment provide pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; transaction processing; and techniques performed by the instrumentation module 118 and the security validation module 120.

Figure 4:
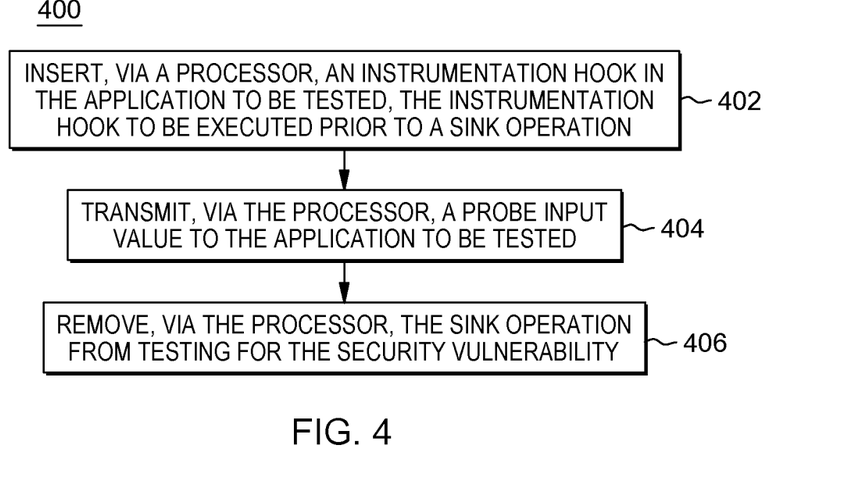
FIG. 4 is a process flow diagram of an example method that can test an application for a security vulnerability, according to an embodiment described herein.

FIG. 4 is an example of a method that can test an application for a security vulnerability. The method 400 can be implemented with any suitable computing device, such as the computer system/server 102 of FIG. 1.

At block 402, the instrumentation module 118 can insert, via the processor 502 (see FIG. 5), an instrumentation hook in the application to be tested, wherein the instrumentation hook is to be executed prior to a sink operation. As discussed above, a sink operation includes any security sensitive operation, such as a database operation, a file system operation, or a web based operation, among others. The sink operation can transmit data to any suitable number of external sources. Accordingly, the sink operation can potentially transmit or forward malicious content that is included in the received input.

In some embodiments, the instrumentation hook can include any suitable operation or function that can detect and monitor values of variables or objects at a point in execution of the application. For example, the instrumentation hook can indicate that a variable or object has a value that matches a predetermined value at a point in execution of the application. In some embodiments, the instrumentation module 118 can detect any suitable number of sink operations in an application and insert an instrumentation hook that is to be executed prior to each of the sink operations.

In some embodiments, the instrumentation hooks can be inserted into an application without the source code. For example, the instrumentation module 118 can detect an application and can use any suitable binary code editing technique to insert instrumentation hooks prior to sink operations.

At block 404, the instrumentation module 118 can transmit, via the processor 502 (see FIG. 5), a probe input value to the application to be tested. As discussed above, the probe input value can include any scripting language characters or structured query language characters, among others. In some examples, the probe input value may not include an executable script or structured query language operation. Rather, the probe input value may include characters common to a scripting language or structured query language. For example, the probe input value corresponding to a scripting language may include brackets or any other suitable characters common to scripts written in a scripting language. In some embodiments, the probe input value can be a benign value that is not associated with a security vulnerability. For example, the probe input value can be any suitable alphanumeric character, among others.

In some embodiments, the probe input value can be transmitted to an application through any suitable input operation. For example, the probe input value can be transmitted to an application through any suitable graphical user interface, text box, or Inter-Process Communication (IPC), among others. For example, the Intent.getData application programming interface (API) call in an operating system may receive data, including the probe, from another application.

At block 406, the security validation module 120 can remove, via the processor, the sink operation from testing for the security vulnerability. In some embodiments, the sink operation is removed from testing in response to detecting a modification to the probe input value. For example, an application that can detect the probe input value includes a scripting language character or a structured query language character, and the application can sanitize the probe input value. Sanitizing a probe input value can include removing control characters to prevent a script or operation from being executed. In some examples, the security validation module 120 can detect the modification to the probe input value at the instrumentation hook by comparing the probe input value at the instrumentation hook to a signature value, and detecting that the probe input value matches the signature value. The signature value can include a data value that is to match the probe input value after the probe input value is sanitized. For example, the signature value can include a scripting operation without control characters or a structured query language operation that is modified to not be executable. In some embodiments, the probe input value can be the signature value, and the probe input value can indicate that the value originated from a testing technique. For example, the probe input value can be a particular value reserved for testing a sink operation.

The security validation module 120 can detect if the probe input value has been sanitized or modified at the instrumentation hook, which indicates that the application has addressed a security threat presented from the probe input value. The security validation module 120 detects a modification to the probe input value prior to executing the sink operation to ensure that the sink operation does not share or transmit a probe input value that includes malicious content to external sources, such as databases, file systems, and web servers, among others. Accordingly, the security validation module 120 can determine that the sink operation following the instrumentation hook is not to be tested for security vulnerabilities that correspond to the probe input value. For example, if the security validation module 120 detects that the application modifies or sanitizes probe input values that include scripting characters or structured query language characters, the security validation module 120 can remove tests corresponding to scripting or structured query language security vulnerabilities. In some examples, the security validation module 120 can remove a sink operation from testing if the application sanitizes or modifies a probe input value that corresponds to each security vulnerability being tested. In other examples, the security validation module 120 may reduce the number of security vulnerabilities for which each sink operation is to be tested.

The security validation module 120 can also remove a sink operation from testing if the sink operation is not executed or the sink operation is executed without the probe input value. For example, the security validation module 120 can remove the sink operation from testing in response to detecting that the sink operation is never executed in an application. Therefore, testing the sink operation for a security vulnerability may be unnecessary. Similarly, the security validation module 120 may remove a sink operation from testing if the sink operation is not executed with a probe input value. For example, the sink operation may be executed without any input values. Accordingly, testing the sink operation for a security vulnerability may be unnecessary if the sink operation is not executed with a probe input value.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the security validation module 120 can detect a set of vulnerability test operations corresponding to the probe input value, detect that the probe input value matches criterion at the instrumentation hook, and/or test the sink operation with the set of vulnerability test operations. For example, the security validation module 120 can detect if a probe input value matches criterion associated with a security vulnerability, such as an unmodified probe input value, and the like.

The set of vulnerability test operations test an application's ability to protect against security threats that correspond to the probe input value. For example, the set of security vulnerability tests may correspond to malicious scripts, structured query language operations, and the like. Furthermore, in some embodiments, the sink operation can be tested for additional security vulnerabilities using additional probe input values and instrumentation hooks. In some examples, the security validation module 120 can also remove the sink operation from testing for the security vulnerability in response to detecting that the sink operation is not executed or that the sink operation is executed without the probe input value. For example, the security validation module 120 can determine that a probe input value may not have an effect on a sink operation, and therefore, the sink operation may not be tested using the probe input value.

Figure 5:
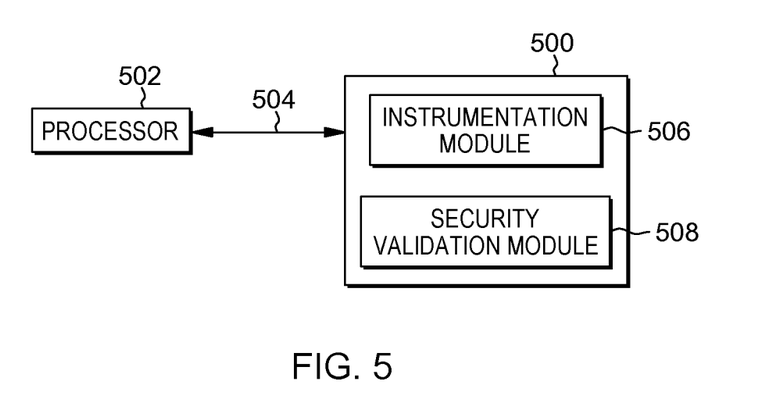
FIG. 5 is a tangible, non-transitory computer readable medium that can test an application for a security vulnerability, according to an embodiment described herein.

Referring now to FIG. 5, a block diagram is depicted of an example of a tangible, non-transitory computer readable medium that can test an application for a security vulnerability. The tangible, non-transitory, computer readable medium 500 may be accessed by a processor 502 over a computer interconnect 504. Furthermore, the tangible, non-transitory, computer readable medium 500 may include code to direct the processor 502 to perform the operations of the current method.

The various software components discussed herein may be stored on the tangible, non-transitory, computer readable medium 500, as indicated in FIG. 5. For example, an instrumentation module 506 can insert, via the processor, an instrumentation hook in the application to be tested, the instrumentation hook to be executed prior to a sink operation, and transmit, via the processor, a probe input value to the application to be tested. Furthermore, a security validation module 508 can detect, via the processor, a modification to the probe input value at the instrumentation hook and remove, via the processor, the sink operation from testing for the security vulnerability in response to detecting the modification to the probe input value. In some embodiments, the security validation module 508 can also remove a sink operation from testing for a security vulnerability if the sink operation is not executed with the probe input value or if the sink operation is not executed by the application. The security validation module 508 can also remove a sink operation from testing for a security vulnerability if the security validation module 508 detects that the sink operation is not executed or the sink operation is executed without the probe input value.

It is to be understood that any number of additional software components not shown in FIG. 5 may be included within the tangible, non-transitory, computer readable medium 500, depending on the specific application.

In some embodiments, the process software, such as the instrumentation module 118 or 506 and the security validation module 120 or 508, can be shared simultaneously, serving multiple customers in a flexible, automated fashion. Therefore, they are standardized (i.e., requiring little customization) and scalable (i.e., providing capacity On demand in a pay-as-you-go model).

The process software can be stored on a shared file system accessible from one or more servers. The process software is executed via transactions that contain data and server processing requests that use central processing unit (CPU) units on the accessed server. CPU units are units of time such as minutes, seconds, and/or hours on the central processor of the server. Additionally the accessed server may make requests of other servers that require CPU units. CPU units are an example that represents only one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6:
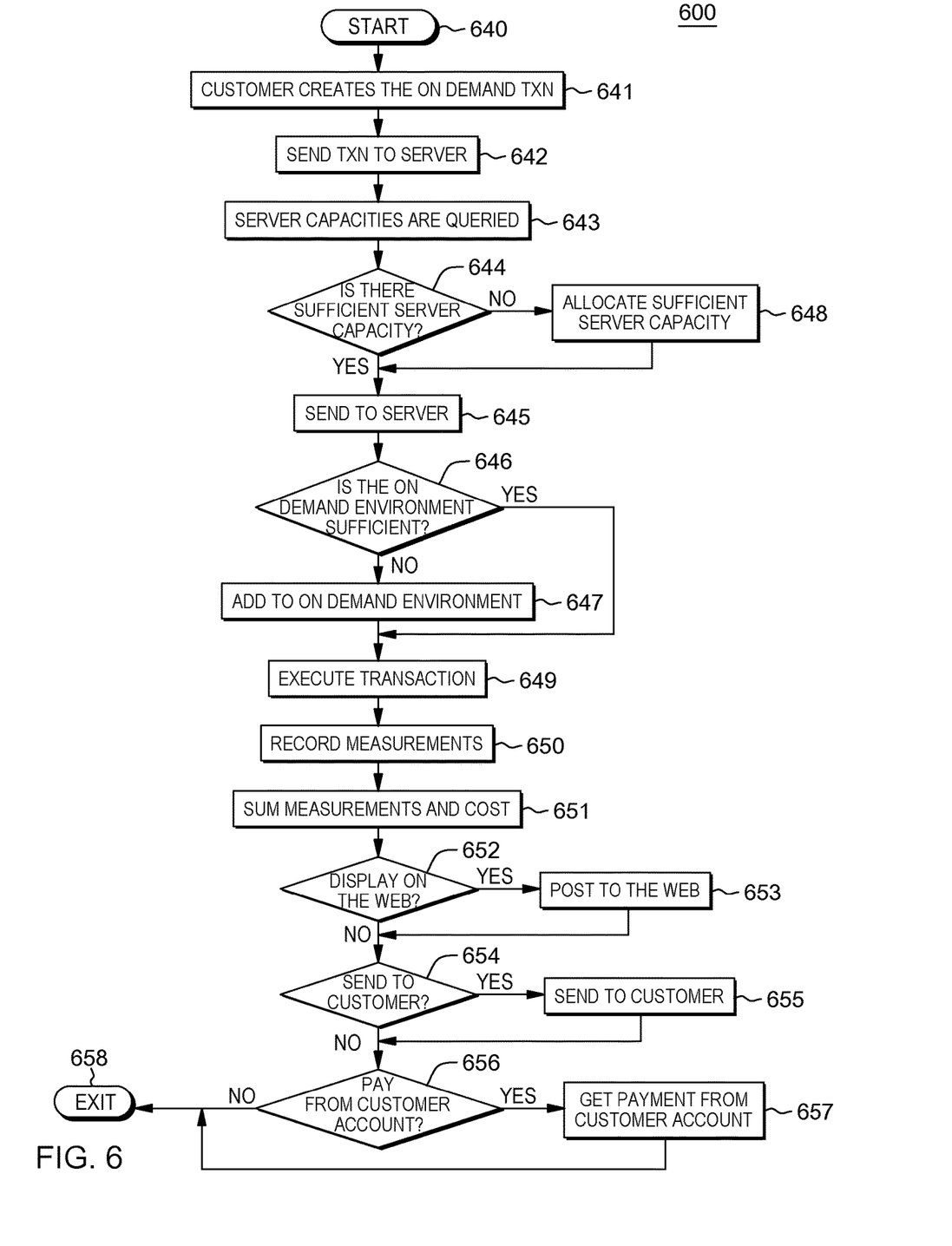
FIG. 6 is a process flow diagram of an On demand process for testing an application for a security vulnerability, according to an embodiment described herein.

Referring to FIG. 6, a process flow diagram 600 for an On demand process for testing an application for a security vulnerability is provided. Step 640 begins the On Demand process. A transaction is created that contains the unique customer identification, the requested service type, and any service parameters that further specify the type of service (Step 641). The transaction is then sent to the main server (Step 642). In an On Demand environment the main server can initially be the only server, and then as capacity is consumed other servers are added to the On Demand environment.

The server central processing unit (CPU) capacities in the On Demand environment are queried (Step 643). The CPU requirement of the transaction is estimated, then the server's available CPU capacity in the On Demand environment is compared to the transaction CPU requirement to see if there is sufficient CPU available capacity in any server to process the transaction (Step 644). If there is not sufficient server CPU available capacity, then additional server CPU capacity is allocated to process the transaction (Step 648). If there was already sufficient available CPU capacity, then the transaction is sent to a selected server (Step 645).

Before executing the transaction, a check is made of the remaining On Demand environment to determine if the environment has sufficient available capacity for processing the transaction. This environment capacity consists of such things as, but not limited to, network bandwidth, processor memory, storage, etc. (Step 646). If there is not sufficient available capacity, then capacity will be added to the On Demand environment (Step 647). Next, the required software to process the transaction is accessed, loaded into memory, and then the transaction is executed (Step 649).

The usage measurements are recorded (Step 650). The usage measurements consist of the portions of those functions in the On Demand environment that are used to process the transaction. The usage of such functions as, but not limited to, network bandwidth, processor memory, storage, and CPU cycles are what is recorded. The usage measurements are summed, multiplied by unit costs, and then recorded as a charge to the requesting customer (Step 651).

If the customer has requested that the On Demand costs be posted to a website (Step 652), then they are posted (Step 653). If the customer has requested that the On Demand costs be sent via e-mail to a customer address (Step 654), then they are sent (Step 655). If the customer has requested that the On Demand costs be paid directly from a customer account (Step 656), then payment is received directly from the customer account (Step 657). The last step is exit (Step 658) the On Demand process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider). In some embodiments, electronic circuitry, including, for example, programmable logic circuitry, field-programmable gate arrays (FPGA), or programmable logic arrays (PLA), may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create a means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium, having instructions stored therein, comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products, according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
one or more computer processors, one or more computer readable storage media, and program instructions stored on the one or more computer readable storage media for execution by at least one of the one or more computer processors, the program instructions comprising:
program instructions to, prior to a sink operation for a file system operation, insert an instrumentation hook in an application to be tested by editing binary code;
program instructions to transmit a probe input value shared by a security vulnerability;
program instructions to, subsequent to a sanitation process on the probe input value, detect that a modification to the probe input value matches a signature value, wherein the signature value includes a structured query language operation that is modified to not be executable; and
program instructions to remove the sink operation from testing for the security vulnerability and to remove tests corresponding to structured query language security vulnerabilities.

2. The computer system of claim 1, wherein the probe input value is selected from the group consisting of scripting language characters and structured query language characters.

3. The computer system of claim 1, further comprising:
program instructions, stored on the computer readable storage media for execution by at least one of the one or more computer processors, to detect a set of vulnerability test operations corresponding to the probe input value;
program instructions, stored on the computer readable storage media for execution by at least one of the one or more computer processors, to detect that the probe input value matches a criterion at the instrumentation hook; and
program instructions, stored on the computer readable storage media for execution by at least one of the one or more computer processors, to test the sink operation with the set of vulnerability test operations.

4. The computer system of claim 1, wherein the instrumentation hook monitors variable values in the application.

5. The computer system of claim 1, wherein the sink operation includes a security sensitive operation.

6. The computer system of claim 5, wherein the security sensitive operation is selected from the group consisting of a database operation, a file system operation, and a web based operation.

7. The computer system of claim 1, wherein the program instructions to detect that the modification to the probe input value matches the signature value comprise:
   program instructions to compare the probe input value at the instrumentation hook to the signature value; and
   program instructions to detect that the probe input value matches the signature value.

8. A computer-implemented method comprising:
   prior to a sink operation for a file system operation, inserting, by one or more processors, an instrumentation hook in an application to be tested by editing binary code;
   transmit, by one or more processors, a probe input value shared by a security vulnerability;
   subsequent to a sanitation process on the probe input value, detecting, by one or more processors, that a modification to the probe input value matches a signature value, wherein the signature value includes a structured query language operation that is modified to not be executable; and
   removing, by one or more processors, the sink operation from testing for the security vulnerability and removing tests corresponding to structured query language security vulnerabilities.

9. The computer-implemented method of claim 8, wherein the probe input value is selected from the group consisting of scripting language characters and structured query language characters.

10. The computer-implemented method of claim 8, further comprising:
    detecting, by one or more processors, a set of vulnerability test operations corresponding to the probe input value;
    detecting, by one or more processors, that the probe input value matches a criterion at the instrumentation hook; and
    testing, by one or more processors, the sink operation with the set of vulnerability test operations.

11. The computer-implemented method of claim 8, wherein the instrumentation hook monitors variable values in the application.

12. The computer-implemented method of claim 8, wherein the sink operation includes a security sensitive operation.

13. The computer-implemented method of claim 12, wherein the security sensitive operation is selected from the group consisting of a database operation, a file system operation, and a web based operation.

14. The computer-implemented method of claim 8, wherein detecting that the modification to the probe input value matches the signature value comprises:
    comparing, by one or more processors, the probe input value at the instrumentation hook to the signature value; and
    detecting, by one or more processors, that the probe input value matches the signature value.

15. A computer program product comprising:
    one or more computer readable storage media and program instructions stored on the one or more computer readable storage media, the program instructions comprising:
    program instructions to, prior to a sink operation for a file system operation, insert an instrumentation hook in an application to be tested by editing binary code;
    program instructions to transmit a probe input value shared by a security vulnerability;
    program instructions to, subsequent to a sanitation process on the probe input value, detect that a modification to the probe input value matches a signature value, wherein the signature value includes a structured query language operation that is modified to not be executable; and
    program instructions to remove the sink operation from testing for the security vulnerability and to remove tests corresponding to structured query language security vulnerabilities.

16. The computer program product of claim 15, wherein the probe input value is selected from the group consisting of scripting language characters and structured query language characters.

17. The computer program product of claim 15, further comprising:
    program instructions, stored on the computer readable storage media, to detect a set of vulnerability test operations corresponding to the probe input value;
    program instructions, stored on the computer readable storage media, to detect that the probe input value matches a criterion at the instrumentation hook; and
    program instructions, stored on the computer readable storage media, to test the sink operation with the set of vulnerability test operations.

18. The computer program product of claim 15, wherein the instrumentation hook monitors variable values in the application.

19. The computer program product of claim 15, wherein the sink operation includes a security sensitive operation.

20. The computer program product of claim 19, wherein the security sensitive operation is selected from the group consisting of a database operation, a file system operation, and a web based operation.

* * * * *